(12) United States Patent
Wang et al.

(10) Patent No.: US 11,167,990 B2
(45) Date of Patent: Nov. 9, 2021

(54) NASICON-TYPE SODIUM CATHODE MATERIAL

(71) Applicants: Samsung Electronics Co., Ltd., Suwon-si (KR); The Regents of the University of California, Oakland, CA (US)

(72) Inventors: Yan Wang, Brookline, MA (US); Dong-Hwa Seo, Burlington, MA (US); Jingyang Wang, Emeryville, CA (US); Gerbrand Ceder, Orinda, CA (US)

(73) Assignees: SAMSUNG ELECTRONICS CO., LTD., Gyeonggi-Do (KR); THE REGENTS OF THE UNIVERSITY OF CALIFORNIA, Oakland, CA (US)

( * ) Notice: Subject to any disclaimer, the term of this patent is extended or adjusted under 35 U.S.C. 154(b) by 133 days.

(21) Appl. No.: 16/675,866

(22) Filed: Nov. 6, 2019

(65) Prior Publication Data

US 2020/0308000 A1 Oct. 1, 2020

Related U.S. Application Data

(60) Provisional application No. 62/823,544, filed on Mar. 25, 2019.

(51) Int. Cl.
*H01B 1/06* (2006.01)
*H01M 4/58* (2010.01)
(Continued)

(52) U.S. Cl.
CPC .............. *C01B 25/45* (2013.01); *H01B 1/06* (2013.01); *H01M 4/5825* (2013.01);
(Continued)

(58) Field of Classification Search
CPC . H01B 1/06; H01M 4/04; H01M 4/36; H01M 4/5825; C01B 25/45
See application file for complete search history.

(56) References Cited

U.S. PATENT DOCUMENTS

2012/0308896 A1 12/2012 Asari
2019/0148729 A1* 5/2019 Essehli ............... H01M 4/5825
429/209
(Continued)

FOREIGN PATENT DOCUMENTS

CA 2746409 C 4/2014
CA 2803760 C 6/2015
(Continued)

OTHER PUBLICATIONS

Zhang et al "Full activation of Mn4+/Mn3+ redox in Na4MnCr(PO4)3 as a high-voltage and high-rate cathode material for sodium-ion batteries", Small, vol. 16, Issue 25, May 26, 2020.*
(Continued)

*Primary Examiner* — Mark Kopec
(74) *Attorney, Agent, or Firm* — Cantor Colburn LLP

(57) ABSTRACT

A compound of Formula I:

$$Na_xMn_aM_b(PO_{4-\delta})_3 \quad (I)$$

wherein M is V, Nb, Ga, Cr, Ti, Zr, or a combination thereof, a is equal to or greater than 0.8 to equal to or less than 1.5, b is equal to or greater than 0.5 to equal to or less than 1.2, x is greater than 0 to equal to or less than 4, δ is equal to or greater than 0 to equal to or less than 1, and a sum of a and b is 2.

20 Claims, 12 Drawing Sheets
(2 of 12 Drawing Sheet(s) Filed in Color)

(51) Int. Cl.
*C01B 25/45* (2006.01)
*H01M 10/054* (2010.01)
*H01M 4/02* (2006.01)

(52) U.S. Cl.
CPC ....... *H01M 10/054* (2013.01); *C01P 2002/72* (2013.01); *C01P 2002/85* (2013.01); *C01P 2004/04* (2013.01); *C01P 2006/40* (2013.01); *H01M 2004/028* (2013.01)

(56) References Cited

U.S. PATENT DOCUMENTS

2019/0341611 A1* 11/2019 Yamauchi ............... H01M 4/58
2020/0227724 A1* 7/2020 Min ...................... H01M 4/131

FOREIGN PATENT DOCUMENTS

| EP | 2919304 B1 | 1/2017 |
| JP | 2015026485 A | 2/2015 |
| WO | WO 2016072315 A1 * | 5/2016 |

OTHER PUBLICATIONS

Zhang et al "A novel NASICON-type Na4MnCr(PO4)3 demonstrating the energy density record of phosphate cathodes for sodium-ion batteries", Advances Materials, 2020, 32, 1906348.*

Chen et al.; "A NASICON-Type Positive Electrode for Na Batteries with High Energy Density: Na4MnV(PO4)3"; Small Methods, vol. 3; 2019; 1800218; 9 pages.

Ellis et al.; "Sodium and sodium-ion energy storage batteries"; Current Opinion in Solid State and Materials Science, vol. 16; 2012; pp. 168-177.

Gao et al.; "Na3MnZr(PO4)3: A High-Voltage Cathode for Sodium Batteries"; Journal of the American Chemical Society, vol. 140; 2018; pp. 18192-18199.

Jian et al.; "Superior Electrochemical Performance and Storage Mechanism of Na3V2(PO4)3 Cathode for Room-Temperature Sodium-Ion Batteries"; Advanced Energy Materials, vol. 3; 2013; pp. 156-160.

Kawai et al.; "High-Voltage Cr4+/Cr3+ Redox Couple in Polyanion Compounds"; ACS Applied Energy Materials, vol. 1; 2018; pp. 928-931.

Kim et al.; "Electrode Materials for Rechargeable Sodium-Ion Batteries: Potential Alternatives to Current Lithium-Ion Batteries"; Advanced Energy Materials, vol. 2; 2012; pp. 710-721.

Kubota et al.; "Review—Practical Issues and Future Perspective for Na-Ion Batteries"; Journal of the Electrochemical Society, vol. 162 No. 14; 2015; pp. A2538-A2550.

Liu et al.; "Exploring Highly Reversible 1.5-Electron Reactions (V3+/V4+/V5+) in Na3VCr(PO4)3 Cathode for Sodium-Ion Batteries"; ACS Applied Materials & Interfaces, vol. 9; 2017; pp. 43632-43639.

Masquelier et al.; "Polyanionic (Phosphates, Silicates, Sulfates) Frameworks as Electrode Materials for Rechargeable Li (or Na) Batteries"; Chemical Reviews, vol. 113; 2013; pp. 6552-6591.

Pan et al.; "Room-temperature stationary sodium-ion batteries for large-scale electric energy storage"; Energy & Environmental Science, vol. 6; 2013; pp. 2338-2360.

Xiang et al.; "Recent Advances and Prospects of Cathode Materials for Sodium-Ion Batteries"; Advanced Materials, vol. 27; 2015; pp. 5343-5364.

Zakharkin et al.; "Enhancing Na+ Extraction Limit through High Voltage Activation of the NASICON-Type Na4MnV (PO4)3 Cathode"; ACS Applied Energy Materials, vol. 1; 2018; pp. 5842-5846.

Zhou et al.; "NaxMV(PO4)3 (M = Mn, Fe, Ni) Structure and Properties for Sodium Extraction"; Nano Letters, vol. 16; 2016; pp. 7836-7841.

Zhu et al.; "Realizing Three-Electron Redox Reactions in NASICON-Structured Na3MnTi(PO4)3 for Sodium-Ion Batteries"; Advanced Energy Materials, vol. 9; 2019; 1803436; 6 pages.

* cited by examiner

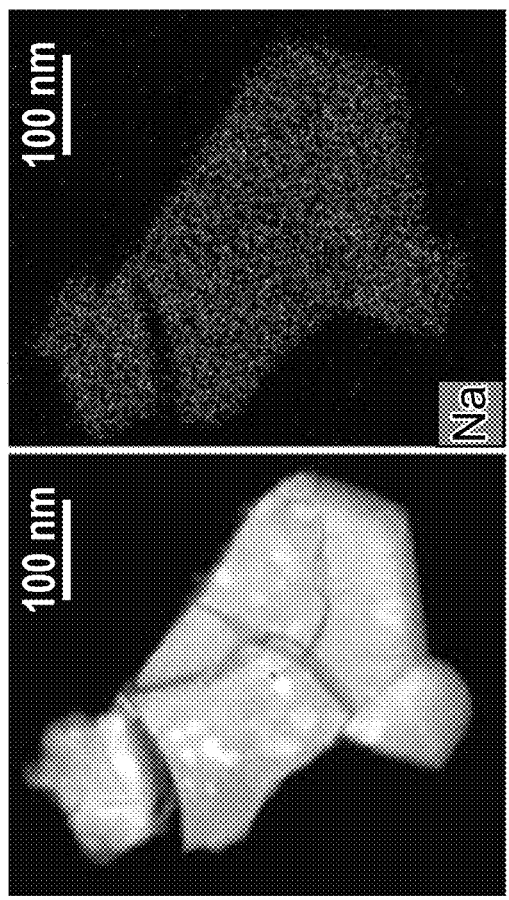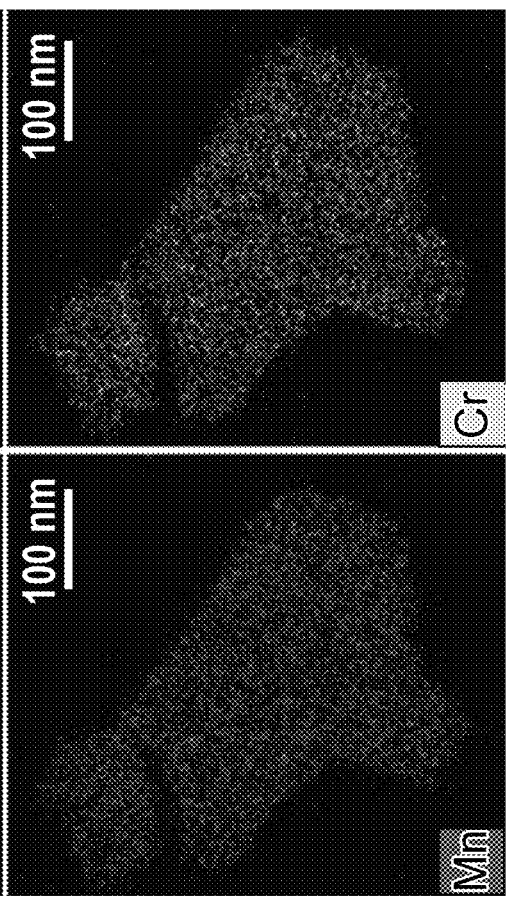
FIG. 5A  FIG. 5B  FIG. 5C  FIG. 5D

NASICON-TYPE SODIUM CATHODE MATERIAL

CROSS REFERENCE TO RELATED APPLICATION

This application claims priority to and the benefit of U.S. Provisional Patent Application Ser. No. 62/823,544, filed on Mar. 25, 2019, and all the benefits accruing therefrom under 35 U.S.C. § 119, the content of which is incorporated herein by reference in its entirety.

BACKGROUND

Sodium-ion batteries offer the potential of reduced cost relative to lithium ion batteries. Sodium layered oxides have been extensively investigated, however available layered sodium oxides have many deficiencies relative to lithium alternatives, including a low operating voltage and high capacity fade. Thus there remains a need for an improved sodium ion electrode material.

SUMMARY

Disclosed is a compound of Formula I:

$$Na_xMn_aM_b(PO_{4-\delta})_3 \quad \text{(I)}$$

wherein
M is V, Nb, Ga, Cr, Ti, Zr, or a combination thereof,
a is equal to or greater than 0.8 to equal to or less than 1.5,
b is equal to or greater than 0.5 to equal to or less than 1.2,
x is greater than 0 to equal to or less than 4,
$\delta$ is equal to or greater than 0 to equal to or less than 1, and
a sum of a and b is 2.

Also disclosed is an electrode composition including: the compound of Formula 1; and a conductive agent, a binder, or a combination thereof.

Also disclosed is a positive electrode including: a current collector; and the compound of Formula 1 on the current collector.

Also disclosed is a sodium-ion battery including: a positive electrode; a negative electrode; and an electrolyte between the positive electrode and the negative electrode, wherein the positive electrode includes the compound of Formula 1.

Also disclosed is a method of synthesizing a compound of Formula I, the method including: providing a precursor including Na, a precursor including Mn, and a precursor including M, wherein the precursor including Na, the precursor including Mn, the precursor including M, or a combination thereof is a phosphate; combining the precursor including Na, the precursor including Mn and the precursor including M to provide a mixture; and thermally treating the mixture to synthesize the compound of Formula I

$$Na_xMn_aM_b(PO_{4-\delta})_3 \quad \text{(I)}$$

wherein
M is V, Nb, Ga, Cr, Ti, Zr, or a combination thereof,
a is equal to or greater than 0.8 to equal to or less than 1.5,
b is equal to or greater than 0.5 to equal to or less than 1.2,
x is greater than 0 to equal to or less than 4,
$\delta$ is equal to or greater than 0 to equal to or less than 1, and
a sum of a and b is 2.

Also disclosed is a method of manufacturing a positive electrode, the method including: disposing a composition including the compound of Formula 1 on a current collector to manufacture the positive electrode.

Also disclosed is a method of manufacturing a sodium-ion battery, the method including: providing a positive electrode including the compound of claim 1, a negative electrode, and separator; disposing the separator between the positive electrode and the negative electrode; and contacting the positive electrode and the negative electrode with the electrolyte between to manufacture the sodium ion battery.

The above described and other features are exemplified by the following figures and detailed description.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The following figures are exemplary aspects wherein the like elements are numbered alike, in which:

FIG. 5A a high-angle annular dark-field (HAADF) scanning transmission electron microscope (STEM) image of a $Na_4MnCr(PO_4)_3$ particle;

FIG. 5B is a Na map in the $Na_4MnCr(PO_4)_3$ particle of FIG. 6A acquired by energy-dispersive X-ray spectrometry (EDX) mapping;

FIG. 5C is a Mn map in the $Na_4MnCr(PO_4)_3$ particle of FIG. 6A acquired by EDX mapping;

FIG. 5D is a Cr map in the $Na_4MnCr(PO_4)_3$ particle of FIG. 6A acquired by EDX mapping;

DETAILED DESCRIPTION

Figure 1:
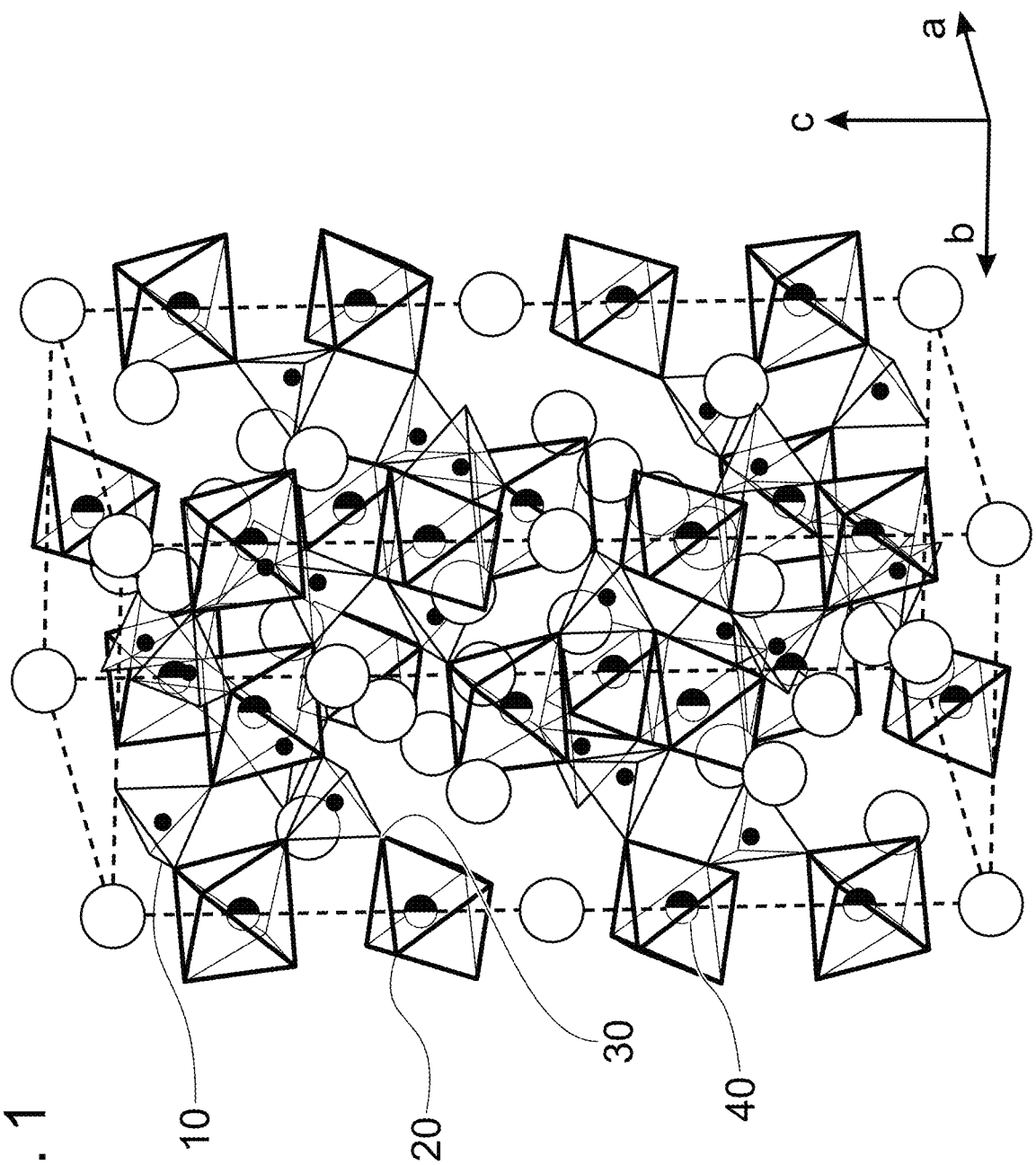
FIG. 1 is a schematic view of a crystal structure of $Na_4MnCr(PO_4)_3$ determined by Rietveld refinement, when viewed from the a axis to be plane.

A description of example aspects is provided on the following pages. The text and figures are provided solely as examples to aid the reader in understanding the invention. They are not intended and are not to be construed as limiting the scope of this invention in any manner. Although certain aspects and examples have been provided, it will be apparent to those skilled in the art based on the disclosures herein that changes in the aspects and examples shown may be made without departing from the scope of this invention.

The terms "NASICON-type structure," "NASICON-type compound," "NASICON-type material," or other like terms, as used herein refer to materials having a crystal structure that is isostructural with $Na_{1+x}Zr_2Si_xP_{3-x}O_{12}$, wherein $0<x<3$. In $Na_{1+x}Zr_2Si_xP_{3-x}O_{12}$, metal centered oxygen octahedra, e.g., $ZrO_6$ octahedra, share corners with $PO_4$ or $SiO_4$ tetrahedra, and sodium ions are located at interstitial positions.

Sodium-ion batteries have been increasingly studied, and are considered an alternative to lithium ion batteries because of the high abundance of sodium and potential low cost. However, the capacity and cycle life of the positive electrode active material, i.e., the cathode active material, is still a challenge for sodium ion technology. The increasing demand for electronic devices has driven studies for high energy density sodium ion cathode materials.

Sodium layered oxide materials have been extensively investigated as positive electrode active materials because of their large theoretical capacity and composition diversity. However, many sodium layered oxide materials suffer from low operating voltage, and their capacity may fade as the layered structure tends to collapse upon cycling at high voltage.

Disclosed is a material with an unexpectedly stable three-dimensional (3D) framework and having unexpectedly high sodium ion mobility and long-term cyclability. The compounds disclosed are sodium (Na) Super Ionic CONductor) compounds hereinafter referred to as "NASICON"-type compounds. The disclosed NASICON-type compound provides unexpectedly improved voltage and capacity. For example, the Applicants have discovered that the disclosed compound can reversibly intercalate and deintercalate two sodium ions at a high voltage, e.g., an average voltage of 3.4 V according to some aspects, with a desirable capacity retention. Also, various transition metals may be substituted in the disclosed NASICON-type compound to provide advantageous properties, such as further improved specific energy and energy density. It is contemplated that there can be many variations associated with the disclosed technology.

Disclosed herein is a compound of Formula I:

$$Na_xMn_aM_b(PO_{4-\delta})_3 \quad (I)$$

wherein M is V, Nb, Ga, Cr, Ti, Zr, or a combination thereof,
a is equal to or greater than 0.8 to equal to or less than 1.5,
b is equal to or greater than 0.5 to equal to or less than 1.2,
x is greater than 0 to equal to or less than 4,
δ is equal to or greater than 0 to equal to or less than 1, and
a sum of a and b is 2.

While not wanting to be bound by theory, it is understood that the compound of Formula I utilizes both a $Mn^{2+/3+}$ (3.6V) redox couple and a $Mn^{3+/4+}$ (4.2V) redox couple, and a redox couple from M, e.g., $Cr^{3+/4+}$ (4.35V). As a result of use of the multiple redox couples, the disclosed material can provide improved specific capacity and specific energy. For example, $Na_4MnV(PO_4)_3$ and $Na_3MnZr(PO_4)_3$ demonstrate that an average voltage can be increased by utilizing both the $Mn^{2+/3+}$ and the $Mn^{3+/4+}$ redox couples. Also, the compound of Formula I can reversibly intercalate and deintercalated multiple sodium atoms per formula unit, e.g., 2. Na per formula unit, at an average voltage of 3.4 V, resulting in improved capacity.

In an aspect, M is V, Cr, Ti, or a combination thereof. M may be Cr, or Ti. Mentioned is an aspect in which M is Cr.

In the compound of Formula I, a may be 0.8, 0.9, 1, 1.1, 1.2, 1.3, or 1.4, to 0.9, 1, 1.1, 1.2, 1.3, 1.4, or 1.5. In an aspect, a in Formula I may be $0.8 \le a \le 1.5$, $0.9 \le a \le 1.4$, $1 \le a \le 1.3$, $1.1 \le a \le 1.2$, or $0.8 < a < 1.5$, $0.9 < a < 1.4$, or $1 < a < 1.3$. Mentioned is a compound in which a is 1.

In the compound of Formula I, b may be 0.5, 0.6, 0.7, 0.8, 0.9, 1, or 1.1, to 0.6, 0.7, 0.8, 0.9, 1, 1.1, or 1.2. In the compound of Formula I, b may be $0.5 \le b \le 1.2$, $0.6 \le b \le 1.1$, $0.7 \le b \le 1$, $0.8 \le b \le 0.9$, or $0.5 < b < 1.2$, $0.6 < b < 1.1$, or $0.7 < b < 1$. Mentioned is a compound in which b is 1.

In the compound of Formula I, the sum of a and b may be 2. An aspect in which the sum of a and b is 2, i.e., a+b=2, is mentioned.

A feature of the compound of Formula I is that sodium can be reversibly deintercalated and intercalated without unsuitable structural change, resulting in improved cyclability. In an aspect, in the compound of Formula I, x is 0, 0.2, 0.4, 0.6, 0.8, 1.0, 1.2, 1.4, 1.6, 1.8, 2.0, 2.2, 2.3, 2.4, 2.6, 2.8, 3, 3.2, 3.4, 3.6, or 3.8, to 0.4, 0.6, 0.8, 1.0, 1.2, 1.4, 1.6, 1.8, 2.0, 2.2, 2.3, 2.4, 2.6, 2.8, 2.0, 3.2, 3.4, 3.6, 3.8, or 4. Mentioned are compounds in which two sodium atoms per formula unit are reversibly intercalated. In an aspect, x may be 2, 2.2, 2.3, 2.4, 2.6, 2.8, 3, 3.2, 3.4, 3.6, or 3.8, to 2.2, 2.3, 2.4, 2.6, 2.8, 3, 3.2, 3.4, 3.6, 3.8, or 4. Mentioned is an aspect in which $0 \le x \le 2$, $0 \le x < 2$, $0 < x \le 2$, or $0 < x < 2$. Mentioned is an aspect in which $1 \le x \le 3$, $1 \le x < 3$, $1 < x \le 3$, or $1 < x < 3$. Mentioned is an aspect in which $2 \le x \le 4$, $2 \le x < 4$, $2 < x \le 4$, or $2 < x < 4$.

In aspect, an oxygen vacancy may be present. The content of the oxygen vacancy, δ, in Formula I may be 0, 0.1, 0.2, 0.3, 0.4, 0.5, 0.6, 0.7, 0.8, or 0.9 to 0.1, 0.2, 0.3, 0.4, 0.5, 0.6, 0.7, 0.8, 0.9, or 1. In an aspect, the content of the oxygen vacancy, δ, is $0 \le \delta \le 1$, or $0.1 \le \delta \le 0.9$.

The compound of Formula I may have NASICON-type structure, shown schematically in FIG. 1. As shown, the structure includes a $PO_4$ tetrahedron 10 and a metal-centered oxygen octahedron 20 that share a corner 30. A metal 40 of the metal-centered oxygen octahedron may be Mn, V, Nb, Ga, Cr, Ti, Zr, or a combination thereof.

Also disclosed is a positive electrode comprising: a current collector; and the compound of Formula 1 on the current collector. The current collector may comprise aluminum, for example. The positive electrode may comprise a positive active material layer comprising an electrode composition comprising the compound of Formula I on the current collector. The electrode composition of the positive active material layer may comprise, in addition to the compound of Formula I, a conductive agent, a binder, or a combination thereof.

The conductive agent can include, for example, carbon black, carbon fiber, graphite, or a combination thereof. The carbon black can be, for example, acetylene black, Ketjen black, Super P carbon, channel black, furnace black, lamp black, thermal black, or a combination thereof. The graphite can be a natural graphite or an artificial graphite. A combination including at least one of the foregoing can be used. The positive electrode can additionally include an additional conductive agent other than the carbonaceous conductor described above. The additional conductive agent can be an electrically conductive fiber, such as a metal fiber; a metal powder such as a fluorinated carbon powder, an aluminum powder, or a nickel powder; a conductive whisker such as a zinc oxide or a potassium titanate; or a polyphenylene derivative. A combination including at least one of the foregoing can be used.

The binder can facilitate adherence between components of the positive electrode, such as the positive active material and the conductive agent (also referred to as a conductor), and adherence of the positive electrode to a current collector. Examples of the binder include, but are not limited to, polyacrylic acid (PAA), polyvinylidene fluoride, polyvinyl alcohol, carboxymethyl cellulose (CMC), starch, hydroxypropyl cellulose, regenerated cellulose, polyvinylpyrrolidone, tetrafluoroethylene, polyethylene, polypropylene, ethylene-propylene-diene monomer (EPDM), sulfonated EPDM, styrene-butadiene-rubber, fluorinated rubber, a copolymer thereof, or a combination thereof. The amount of the binder can be in a range of 1 part by weight to 10 parts by weight, for example, in a range of 2 parts by weight to 7 parts by weight, based on a total weight of the positive active material. When the amount of the binder is in the range above, e.g., 1 part by weight to 10 parts by weight, the adherence of the positive electrode to the current collector may be suitably strong.

Figure 2:
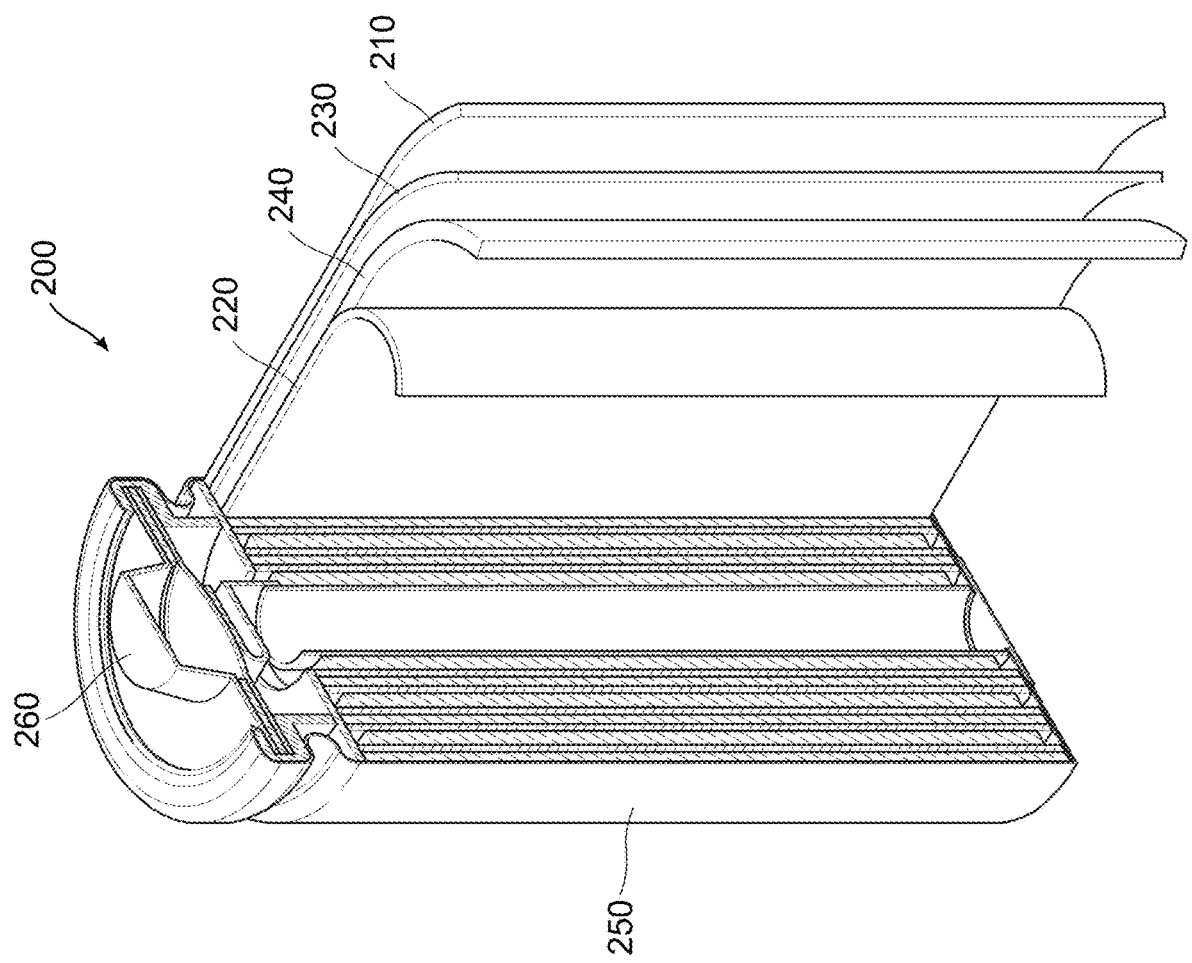
FIG. 2 is a schematic view of an exemplary aspect of a sodium ion battery.

A sodium ion battery 200 includes a positive electrode 210, a negative electrode 220, and an electrolyte between the positive electrode and the negative electrode, as shown in FIG. 2. The sodium-ion battery 200 can optionally include a separator 230. In an aspect in which a solid electrolyte 240 is used, the solid electrolyte may be disposed between the positive electrode and the negative electrode and the solid electrolyte may serve to electrically separate the positive electrode and the negative electrode and thus a distinct separator may be omitted. In an aspect, the positive electrode, the negative electrode, and the separator 230, if present, may be wound or folded, and then sealed in a battery case 250. The battery comprise a liquid electrolyte. The battery may be sealed with a header assembly 260. The sodium ion battery can have any suitable shape, can be prismatic or cylindrical, and can be fabricated in a shape such as a cylinder, a prism, a disk, or a sheet. The shape of sodium ion battery is not limited to the above mentioned shapes, and can have any suitable shape.

The positive electrode comprises the compound of Formula I. The positive electrode may further comprise any suitable compound in which sodium intercalation reversibly occurs, such as an oxide of the formula $NaM1_aO_2$, e.g., $NaFeO_2$, $NaMnO_2$, $NaNiO_2$, or $NaCoO_2$; or an oxide represented by the formula $NaMn_{1-a}M1_aO_2$, wherein M1 is at least one transition metal element, and $0 \leq a < 1$. Representative positive active materials include $Na[Ni_{1/2}Mn_{1/2}]O_2$, $Na_{2/3}[Fe_{1/2}Mn_{1/2}]O_2$; an oxide of the formula $Na_4Mn_9O_{18}$, e.g., $Na_{0.44}Mn_aM1_{1-a}O_2$ wherein M1 is at least one transition metal element, and $0 \leq a < 1$; an oxide of the formula $Na_{0.7}Mn_{1-a}M1_aO_{2.05}$ wherein M1 is at least one transition metal element, and $0 \leq a < 1$; an oxide of the formula $Na_bM2_cSi_{12}O_{30}$, such as $Na_6Fe_2Si_{12}O_{30}$ or $Na_2Fe_5Si_{12}O$, wherein M2 is at least one transition metal element, $2 \leq b \leq 6$, and $2 \leq c \leq 5$; an oxide represented by $Na_dM3_eSi_6O_{18}$ such as $Na_2Fe_2Si_6O_{18}$ or $Na_2MnFeSi_6O_{18}$ wherein $M_3$ is at least one transition metal element, $3 \leq d \leq 6$, and $1 \leq e \leq 2$; an oxide of the formula $Na_fM4_gSi_2O_6$, such as $Na_2FeSiO_6$, wherein M4 is at least one transition metal element, magnesium (Mg), or aluminum (Al), $1 \leq f \leq 2$, and $1 \leq g \leq 2$; a phosphate such as $NaFePO_4$, $Na_3Fe_2(PO_4)_3$, $Na_3V_2(PO_4)_3$, or $Na_4Co_3(PO_4)_2P_2O_7$; a borate such as $NaFeBO_4$ or $Na_3Fe_2(BO_4)_3$; a fluoride of the formula $Na_hM5F_6$ such as $Na_3FeF_6$ or $Na_2MnF_6$ (wherein M5 is at least one transition metal element, and $2 \leq h \leq 3$), or a fluorophosphate such as $Na_3V_2(PO_4)_2F_3$ or $Na_3V_2(PO_4)_2FO_2$. The positive active material is not limited to the foregoing and any suitable positive active material may be used. In an embodiment, the positive active material may preferably comprises a layered-type oxide cathode material such as $NaMnO_2$, $Na[Ni_{1/2}Mn_{1/2}]O_2$ and $Na_{2/3}[Fe_{1/2}\ Mn_{1/2}]O_2$, a phosphate such as $Na_3V_2(PO_4)_3$ or $Na_4Co_3(PO_4)_2P_2O_7$, or a fluorophosphate such as $Na_3V_2(PO_4)_2F_3$ or $Na_3V_2(PO_4)_2FO_2$. A combination comprising at least one of the foregoing positive active materials can be used.

The negative electrode may comprise a negative active material, and optionally a conductive agent, and a binder. The negative active material may comprise a hard carbon, soft carbon, carbon black, Ketjen black, acetylene black, activated carbon, carbon nanotube, carbon fiber, amorphous carbon, graphite, or a combination thereof. The negative electrode may comprise sodium metal, or a sodium containing metal or alloy, wherein the metal may comprise any suitable metal, e.g., Sn, Sb, or Ge. The negative active material may comprise a sodium containing metal oxide, metal nitride, metal sulfide, or a combination thereof. The sodium containing metal oxide, metal nitride, metal sulfide may be a sodium intercalation compound, each independent may comprise Ti, Mo, Sn, Fe, Sb, Co, V, or a combination thereof. Also mentioned for the negative active material is phosphorous (P) or a metal doped phosphorous (e.g., $NiP_3$). The negative active material is not limited to the foregoing and any suitable negative active material can be used. Use of a carbon, e.g., graphite, is mentioned. If desired, the negative electrode may comprise a current collector, e.g., a copper current collector made from a copper foil.

The electrolyte can be a liquid electrolyte, a solid electrolyte, a gel, or a combination thereof.

A liquid electrolyte and can include a polar aprotic solvent and a sodium salt in the solvent. The polar aprotic solvent can be dimethylether, diethylether, dimethyl carbonate, diethyl carbonate, ethylmethyl carbonate, dipropyl carbonate, methylpropyl carbonate, ethylpropyl carbonate, ethylene carbonate, propylene carbonate, butylene carbonate, fluoroethylene carbonate, methyl acetate, ethyl acetate, n-propyl acetate, dimethylacetate, methyl propionate, ethyl propionate, γ-butyrolactone, decanolide, valerolactone, mevalonolactone, caprolactone, dibutyl ether, tetraglyme, diglyme, polyethylene glycol dimethylether, dimethoxy ethane, 2-methyl tetrahydrofuran, 2,2-dimethyl tetrahydrofuran, 2,5-dimethyl tetrahydrofuran, cyclohexanone, triethylamine, triphenylamine, triether phosphine oxide, acetonitrile, dimethyl formamide, 1,3-dioxolane, sulfolane, or a combination thereof. The organic solvent is not limited thereto, and any suitable solvent can be used. In an aspect, the solvent preferably comprises a carbonate ester, and more preferably comprises propylene carbonate.

The sodium salt may comprise, for example, $NaClO_4$, $NaPF_6$, $NaBF_4$, $NaCF_3SO_3$, $NaN(CF_3SO_2)_2$, $NaN(C_2F_5SO_2)_2$, $NaC(CF_3SO_2)_3$, or a combination thereof. In an aspect, the liquid electrolyte preferably comprises $NaClO_4$, $NaPF_6$, or a combination thereof. The sodium salt is not limited to the foregoing and any suitable salt can be used. A concentration of the salt may be, for example, in a range of 0.01 molar (M) to 5 M.

The solid electrolyte may comprise an ion-conductive inorganic solid, a solid electrolyte including a polymeric ionic liquid and a sodium salt, a solid electrolyte including an ion-conductive polymer and a sodium salt, a solid electrolyte including an electron-conductive polymer, or a combination thereof. For example, the solid-state electrolyte can comprise an oxide-type (e.g., NASICON or $Na_{1+x}Zr_2Si_xP_{3-x}O_{12}$, 0<x<3) or a sulfide type (e.g., $Na_3PS_4$) electrolyte; or a polymer electrolyte, such as poly(ethylene oxide)$_8$: $NaAsF_6$. Oxide-type examples include $Na_3Zr_2Si_2PO_{12}$, $Na_{1+x}Si_xZr_2P_{3-x}O_{12}$ where x is 1.6 to 2.4, Y-doped NaSICON such as $Na_{1+x+y}Zr_{2-y}Y_ySi_xP_{3-x}O_{12}$, $Na_{1+x}Zr_{2-y}Y_ySi_xP_{3-x}O_{12-y}$ where x=2 and y=0.12, Fe-doped NaSICON such as $Na_3Zr_{2/3}Fe_{4/3}P_3O_{12}$, or a combination thereof. Use of $Na_3Si_2Zr_2PO_{12}$ is mentioned. The sulfide-type electrolyte may include a material of the formula $Na_{1+2x}(M1)_{1-x}(M2)(M3)_4$, wherein 0.25<x<1, and M1 is a Group 2 element, a Group 3 element, a Group 12 element, a Group 13 element, or a combination thereof, M2 is a Group 5 element, a Group 14 element, a Group 15 element, or a combination thereof, and M3 is a Group 16 element, such as $Na_{1+2x}Zn_{1-x}PS_4$. Group here refers to a Group of the Periodic Table of the Elements. The solid-state electrolyte is not limited thereto, and suitable solid-state electrolyte can be used.

The polymeric ionic liquid may include, for example, a repeating unit including a cation and an anion. The cation may be an ammonium-based cation, a pyrrolidinium-based cation, a pyridinium-based cation, pyrimidinium-based cation, an imidazolium-based cation, a piperidinium-based cation, a pyrazolium-based cation, an oxazolium-based cation, a pyridazinium-based cation, a phosphonium-based cation, a sulfonium-based cation, a triazole-based cation, or a combination thereof. The anion may be $BF_4^-$, $PF_6^-$, $AsF_6^-$, $SbF_6^-$, $AlCl_4^-$, $HSO_4^-$, $ClO_4^-$, $CH_3SO_3^-$, $CF_3CO_2^-$, $(CF_3SO_2)_2N^-$, $Cl^-$, $Br^-$, $I^-$, $SO_4^-$, $CF_3SO_3^-$, $(C_2F_5SO_2)_2N^-$, $(C_2F_5SO_2)(CF_3SO_2)N^-$, $NO_3^-$, $Al_2Cl_7^-$, $CF_3COO^-$, $CH_3COO^-$, $CF_3SO_3^-$, $(CF_3SO_2)_3C^-$, $(CF_3CF_2SO_2)_2N^-$, $(CF_3)_2PF_4^-$, $(CF_3)_3PF_3^-$, $(CF_3)_4PF_2^-$, $(CF_3)_5PF^-$, $(CF_3)_6P^-$, $SF_5CF_2SO_3^-$, $SF_5CHFCF_2SO_3^-$, $CF_3CF_2(CF_3)_2CO^-$, $(CF_3SO_2)_2CH^-$, $(SF_5)_3C^-$, $(O(CF_3)_2C_2(CF_3)_2O)_2PO^-$, $(CF_3SO_2)_2N^-$, or a combination thereof. For example, the polymeric ionic liquid may comprise poly(diallyldimethyl ammonium) (TFSI), poly(1-allyl-3-methyl imidazolium trifluoromethane sulfonylimide), poly((N-methyl-N-propylpiperidinium bis(trifluoromethane sulfonyl)imide)), or a combination thereof.

The ion-conductive polymer may include, for example, an ion conductive repeating unit from an ether-based monomer, an acryl-based monomer, a methacryl-based monomer, a siloxane-based monomer, or a combination thereof. The ion-conductive polymer may include, for example, polyethylene oxide (PEO), polyvinyl alcohol (PVA), polyvinyl pyrrolidone (PVP), polysulfone, polypropylene oxide (PPO), polymethyl methacrylate, polyethyl methacrylate, polydimethyl siloxane, polyacrylic acid, polymethacrylic acid, polymethyl acrylate, polyethyl acrylate, poly(2-ethylhexyl acrylate), polybutyl methacrylate, poly (2-ethylhexyl methacrylate), polydecyl acrylate, polyethylene vinylacetate, a phosphate ester polymer, polyester sulfide, polyvinylidene fluoride (PVdF), NAFION, or a combination thereof. However, the disclosed embodiment is not limited thereto, and any suitable material for a sodium ion-conductive polymer may be used.

A gel electrolyte may be obtained by adding a low-molecular weight solvent to the solid electrolyte. For example, the gel electrolyte may be obtained by combining a solvent, which is a low-molecular weight organic compound, or an oligomer, and a polymer. For example, the gel electrolyte may be obtained by adding a solvent, which is a low-molecular weight organic compound, or an oligomer, and the polymer electrolyte described above.

The separator may be included between the positive electrode and negative electrode. In an aspect the separator comprises a glass fiber, polyester, polyethylene, polypropylene, polytetrafluoroethylene (PTFE), or a combination thereof. In an aspect the separator may comprise a microporous polymeric film, such as a microporous polyethylene or microporous polypropylene film. In an aspect the separator is a porous olefin film such as polyethylene and polypropylene. A diameter of a pore of the porous olefin film can be 0.01 to 10 micrometers (μm), and a thickness of the separator can be 5 to 300 μm. In greater detail, the separator can be a woven or a non-woven fabric including an olefin-based polymer, such as polypropylene or polyethylene; or a glass fiber. The solid electrolyte may serve the function of the separator, and thus in an aspect in which the solid electrolyte is used the separator may be omitted.

The compound of Formula 1 can be synthesized using a sol-gel method, or a solid state method. For example, an aqueous solution comprising a Na precursor, e.g., sodium phosphate, a Mn precursor, e.g., manganese acetate, and a M precursor, e.g., chromium nitrate, may be dried to provide a gel, and the gel then thermally treated at a suitable temperature, e.g., 300° C. to 800° C., or 400° C. to 700° C., for a suitable time, e.g., 6 hours, in a suitable atmosphere, e.g., argon, to provide the compound of Formula I.

The compound of Formula I may be combined with a conductive agent, a binder, and a solvent, e.g., N-methyl-2-pyrrolidone (NMP), to provide a slurry, and the slurry disposed on a current collector, e.g., aluminum, and the NMP removed to by heating to provide a positive electrode.

The sodium-ion battery can be manufactured by providing the positive electrode material, providing a negative electrode, e.g., sodium metal, and disposing an electrolyte between the positive electrode and negative electrode to manufacture the sodium-ion battery. In an aspect, the method further includes disposing a separator between the positive electrode and the negative electrode. For example, the sodium-ion battery can be manufactured by sequentially laminating the negative electrode, the separator, and the positive electrode; winding or folding the laminated structure, then enclosing the wound or folded structure in a cylindrical or rectangular battery case or pouch, and subsequently disposing, e.g., injecting, the liquid electrolyte into the battery case or pouch to provide the sodium ion battery.

This disclosure is further illustrated by the following examples, which are non-limiting.

EXAMPLES

Example 1-1: Synthesis of $Na_4MnCr(PO_4)_3$ $Na_4MnCr(PO_4)_3$ is synthesized via a sol-gel and solid-state approach. First, stoichiometric amounts of manganese (II) acetate tetrahydrate (Aldrich, 99%), chromium(III) nitrate nonahydrate (Sigma-Aldrich, 99%), sodium phosphate monobasic (Sigma-Aldrich, ≥99%), and sodium acetate (Sigma-Aldrich, ≥99%) are sequentially dissolved in de-ionized water. Citric acid (Sigma-Aldrich, ≥99.5%) is added in a ratio of 3:2 citric acid:manganese (II) acetate tetrahydrate and chromium(III) nitrate nonahydrate. The solution is then stirred at 60° C. for 2 hours before being dried at 90° C. overnight. The resulting gel-like mixture is ground and heat-treated at 400° C. for 6 hours in argon, re-ground, and then heat-treated at 650° C. for 8 hours.

Example 1-2 Structural Characterization of the $Na_4MnCr(PO_4)_3$ of Example 1-1

Figure 3:
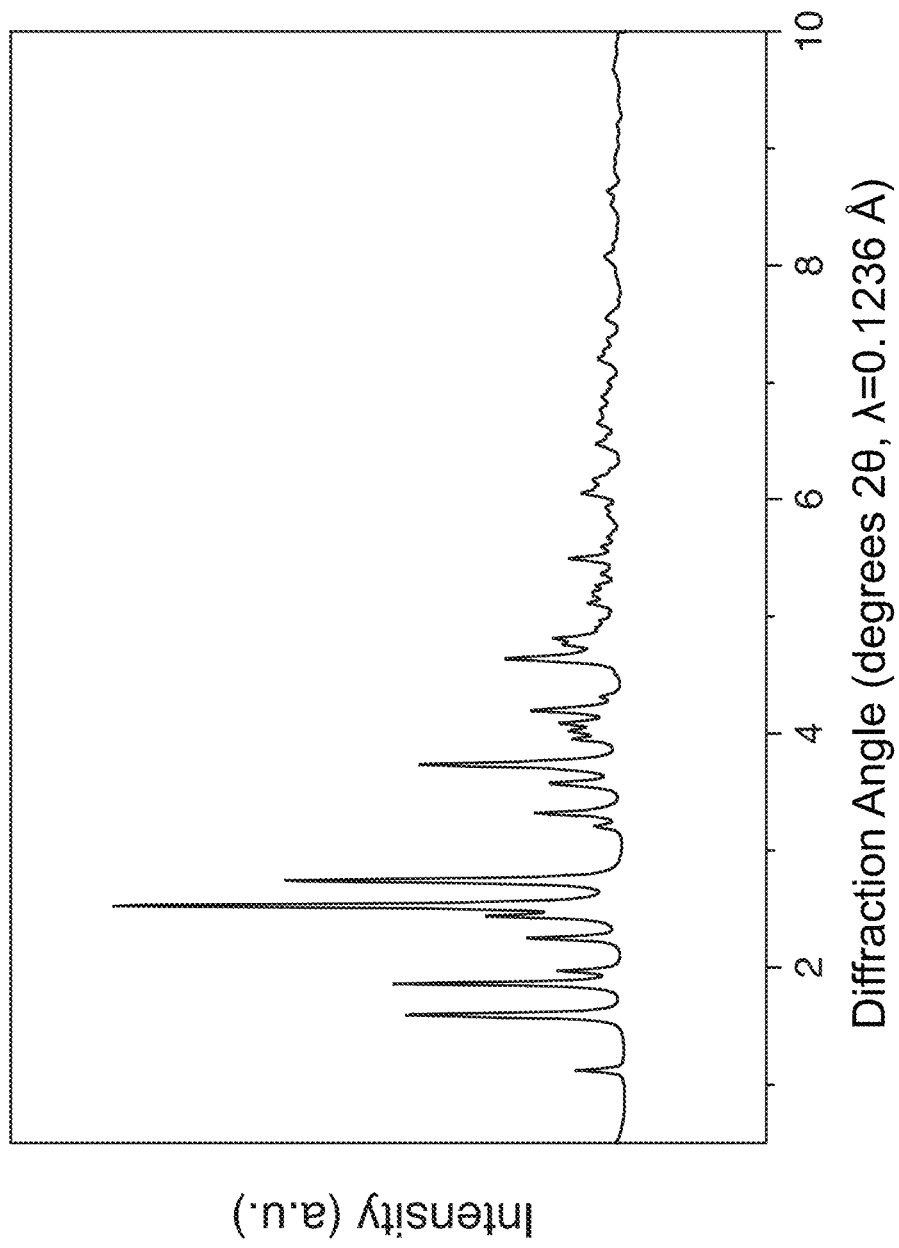
FIG. 3 is a graph of intensity (arbitrary units) versus diffraction angle (degrees 2-theta) and shows the results of X-ray diffraction analysis of $Na_4MnCr(PO_4)_3$ using 0.1236 Å radiation.
Figure 4:
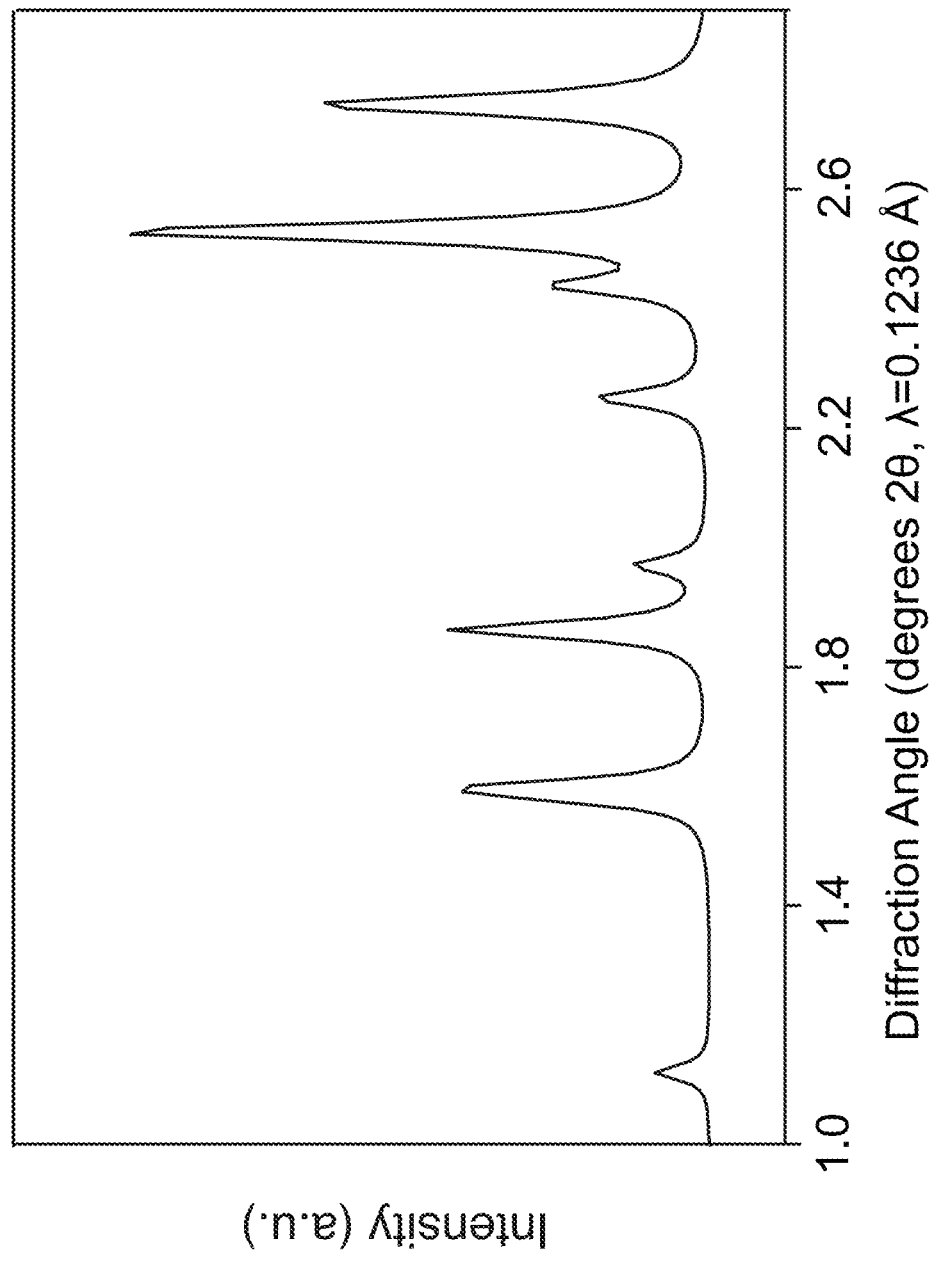
FIG. 4 shows an expanded view of the region from 1 to 2.9° 2θ in FIG. 3.

The $Na_4MnCr(PO_4)_3$ synthesized in Example 1 was analyzed by X-Ray diffraction and the structure determined by Rietveld refinement. The results of the X-Ray diffraction are shown in FIG. 3. FIG. 4 shows an expanded view of the region from 1 to 2.9° 2θ.

The structure of $Na_4MnCr(PO_4)_3$ determined from the Rietveld refinement is shown in FIG. 1, which provides a view along the a axis to be plane. The structure is found to adopt a rhombohedral structure in space group R-3c, with lattice parameters of a=8.923 Å and c=21.47 Å. Illustrated are Mn or Cr centered oxygen octahedra, which share corners with $PO_4$ tetrahedra. The Mn and Cr are found to occupy 12c sites and are six-coordinated by O to provide the $(Mn/Cr)O_6$ octahedra. The Na in the structure are observed to fully occupy two sites, 6b with six-fold coordination, and 18e with eight-fold coordination in the structure.

The results of high-angle annular dark-field (HAADF) analysis of a particle of the $Na_4MnCr(PO_4)_3$ synthesized in Example 1-1 is shown in FIGS. 5A to 5D, in which FIG. 5A is a transmission electron image, and FIGS. 5B to 5C are Mn, Na, and Cr maps, respectively, acquired by energy-dispersive X-ray spectrometry (EDX) mapping. The Na, Mn, and Cr maps show that these elements are homogeneously distributed within the particle, consistent with a determination that the particle is single phase $Na_4MnCr(PO_4)_3$.

Example 1-3: Electrochemical Evaluation of the $Na_4MnCr(PO_4)_3$ of Example 1-1

A positive electrode was prepared by combining the powder of $Na_4MnCr(PO_4)_3$ of Example 1-1, carbon black (Timcal, Super P), and polytetrafluoroethylene (PTFE, Dupont, Teflon 8C) in a weight ratio of 70:30:5. The mixture was then rolled into a thin film inside an argon-filled glove box. To assemble a coin cell for electrochemical tests, 1M $NaPF_6$ in an ethylene carbonate (Sigma-Aldrich, 99%, anhydrous) and diethyl carbonate (Sigma-Aldrich, ≥99%, anhydrous) in a 1:1 solution was used as an electrolyte, and Na metal as a negative electrode. Sodium-ion half-cells were assembled inside an argon-filled glove box using 2032 coin cell hardware.

Figure 6:
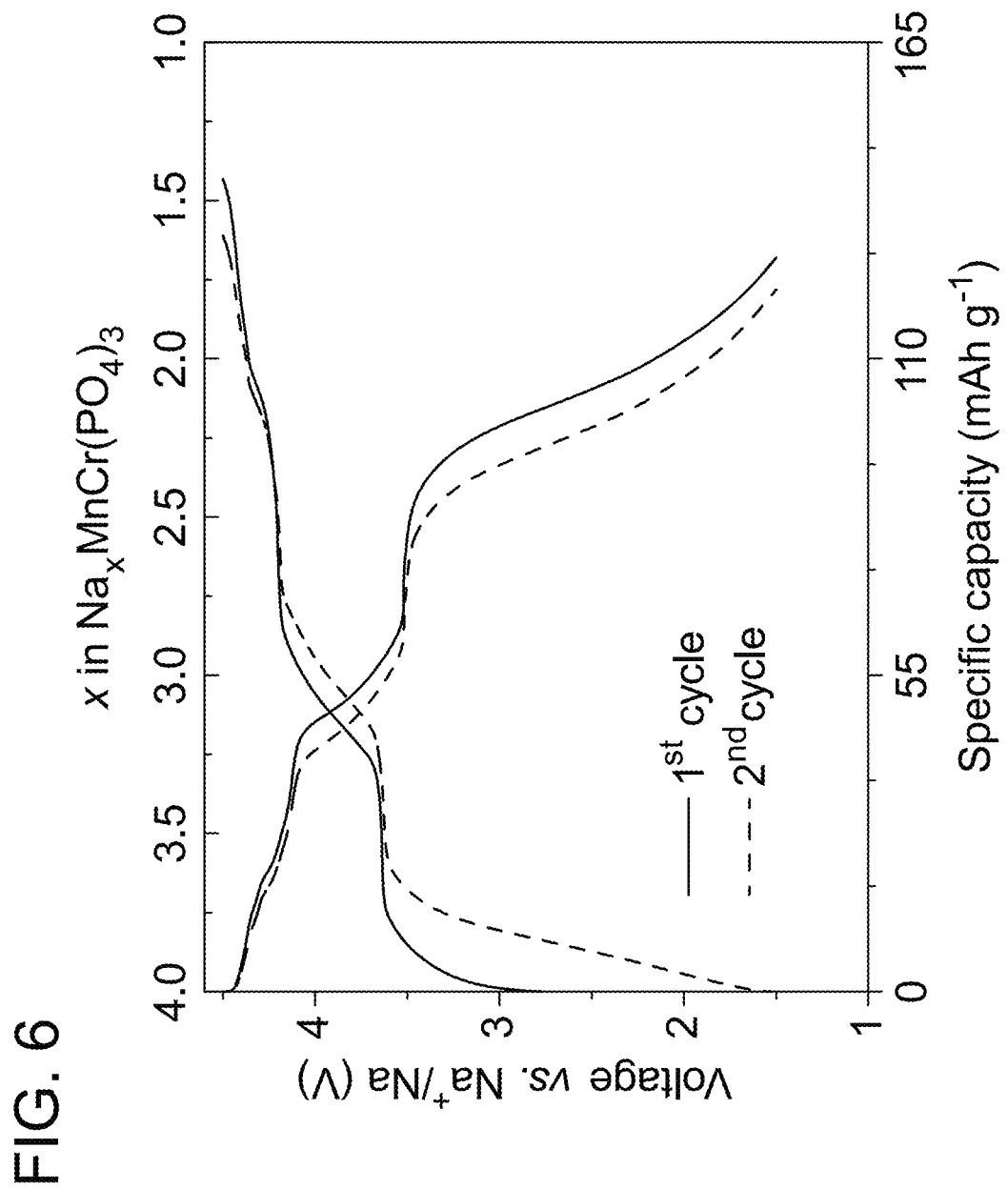
FIG. 6 is a graph of voltage (Volts versus $Na^+/Na$, (V)) versus specific capacity (milliampere-hours per gram ($mAh \cdot g^{-1}$)) of an $Na_4MnCr(PO_4)_3$/Na metal half-cell, and x in $Na_xMnCr(PO_4)_3$.
Figure 7:
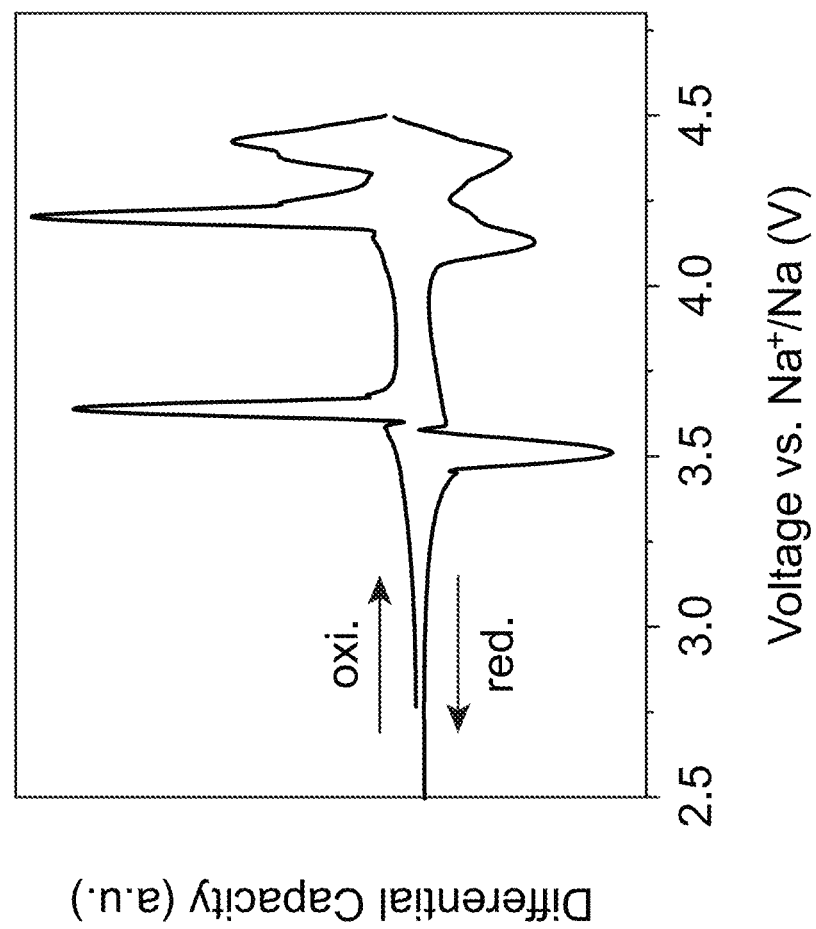
FIG. 7 is a graph of differential capacity (dQ/dV) (arbitrary units) versus voltage (V vs. $Na^+/Na$) for a $Na_4MnCr(PO_4)_3$/Na metal half-cell.
Figure 8:
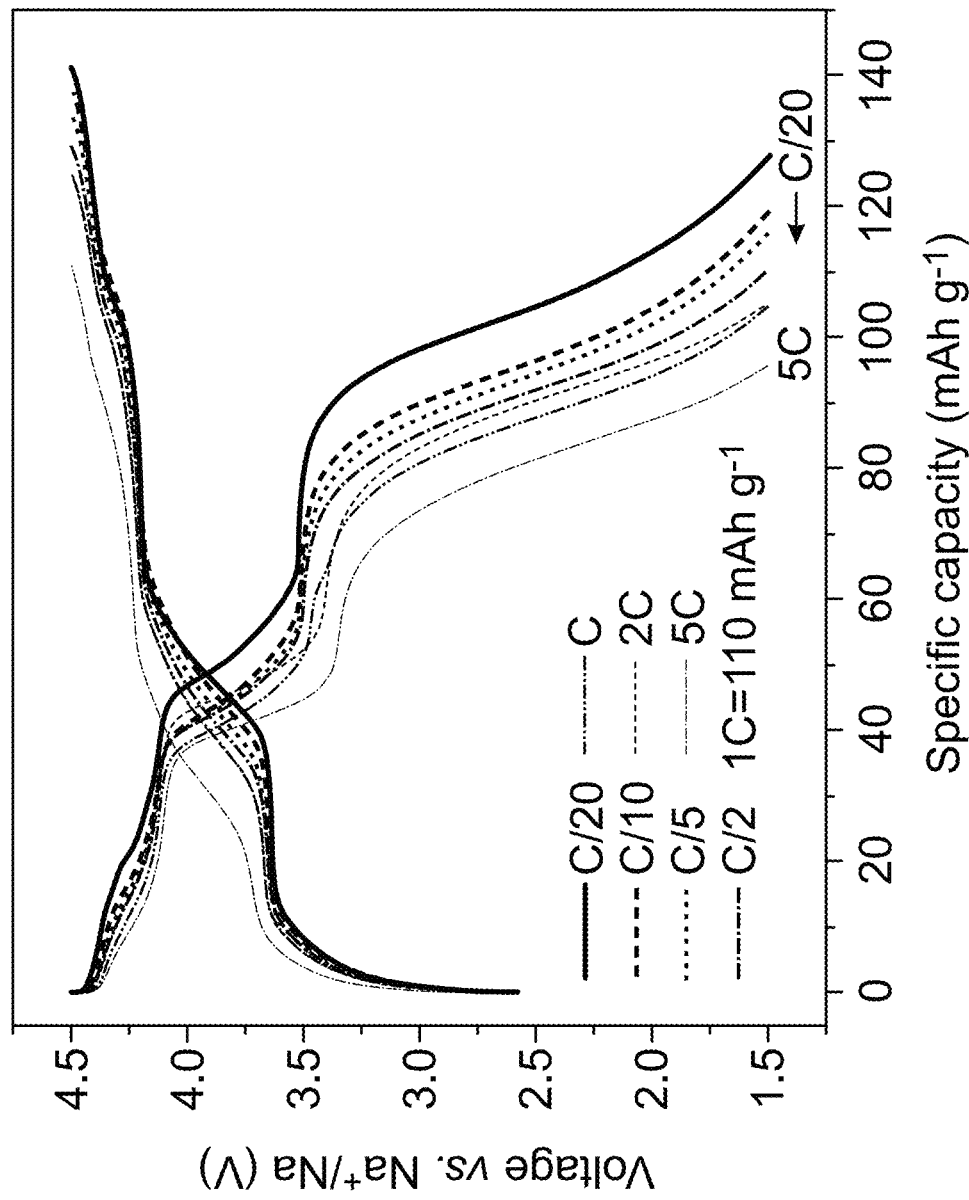
FIG. 8 is a graph of voltage (V) versus specific capacity (milliampere-hours per gram ($mAh \cdot g^{-1}$)) of an $Na_4MnCr(PO_4)_3$/Na metal half-cell, showing additional cycles at rates from C/20 to 5 C.

The sodium-ion half-cell coin cells were cycled using an Arbin instrument at room temperature in galvanostatic modes at rates from C/20 to 5 C, based on 110 milliampere-hours per gram (mAh/g), between 1.5 Volts (V) and 4.5V, as shown in FIGS. 6 to 8, wherein a C rate means a current which will discharge a battery in one hour, e.g., a C rate for a battery having a discharge capacity of 1 ampere-hour would be 1 ampere.

As shown in FIG. 6, the initial charge capacity of the $Na_4MnCr(PO_4)_3$ of Example 1-1 is 143 milliampere-hours per gram (mAh g$^{-1}$), and the discharge capacity is 129 mAh g$^{-1}$ at a C/20 rate, corresponding to 2.58 Na extraction and 2.33 Na insertion. As shown in FIG. 7, the charge/discharge process comprised three distinct plateaus at 3.6/3.5 V, 4.2/ 4.1 V and 4.4/4.35 V, respectively, indicating that both the Mn and Cr were redox active in this material. The $Mn^{2+/3+}$ and $Mn^{3+/4+}$ redox couples contributed to the two plateaus at the lower voltage, and the $Cr^{3+/4+}$ redox couple contributed to the high voltage plateau at 4.4 V. Unexpectedly, the Cr redox in $Na_4MnCr(PO_4)_3$ was reversible. Additional cycles at other rates up to 5 C are shown in FIG. 8.

Figure 9:
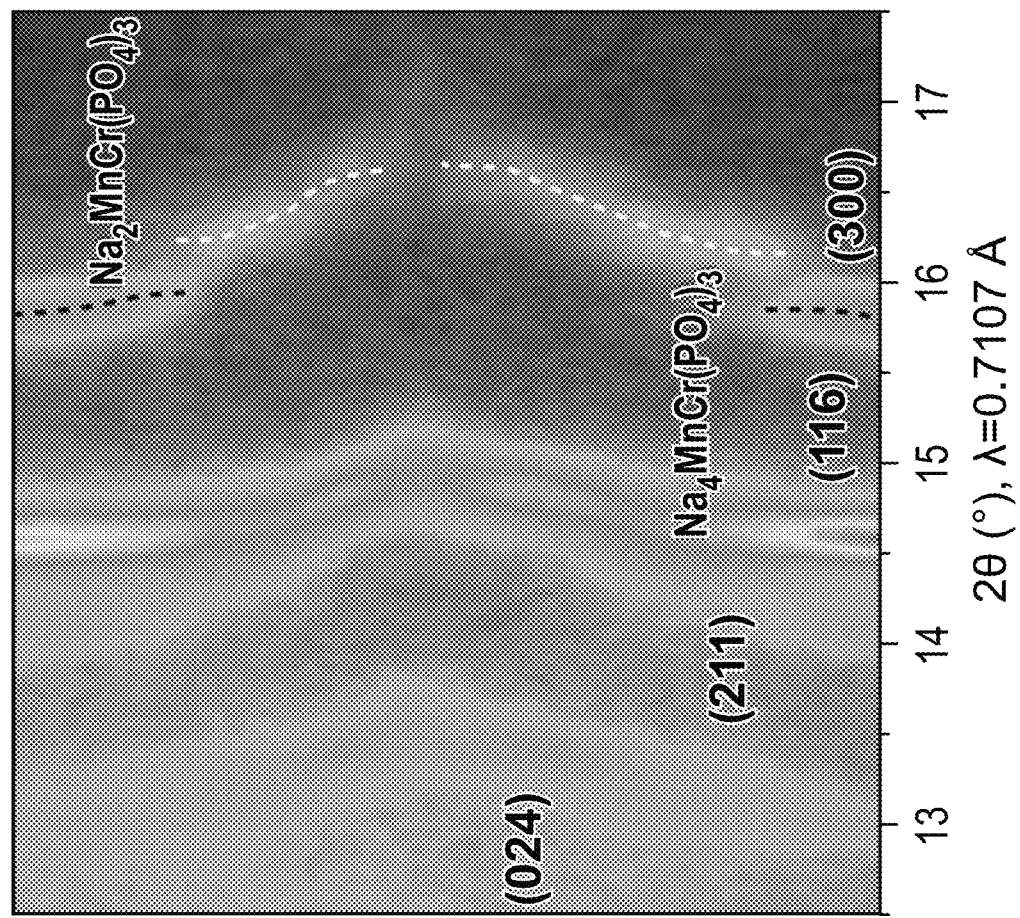
FIG. 9 is a map of intensity (arbitrary units) versus diffraction angle (degrees 2-theta) and shows the results of in-situ X-ray diffraction analysis of $Na_4MnCr(PO_4)_3$ using Mo Kα radiation during a charge and a discharge.
Figure 10:
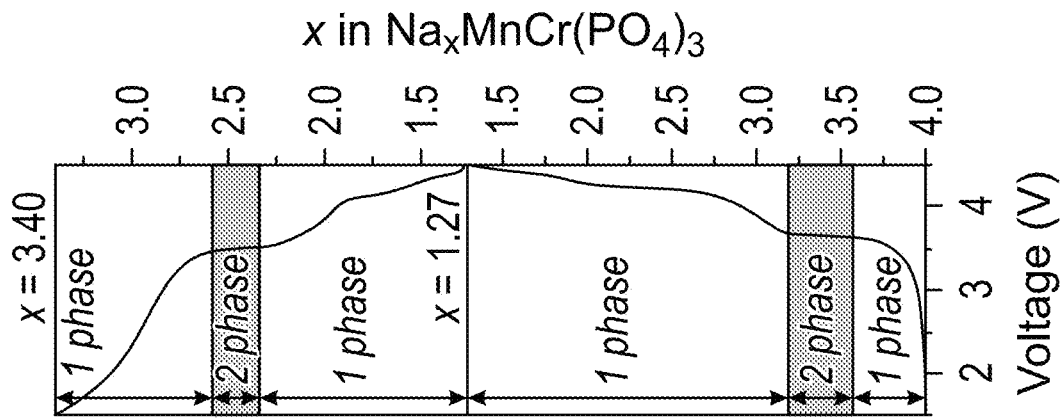
FIG. 10 is a graph of x in $Na_xMnCr(PO_4)_3$ versus voltage (V) as the cell is charged and discharged for the in-situ X-ray diffraction analysis of $Na_4MnCr(PO_4)_3$ shown in FIG. 9.
Figure 11:
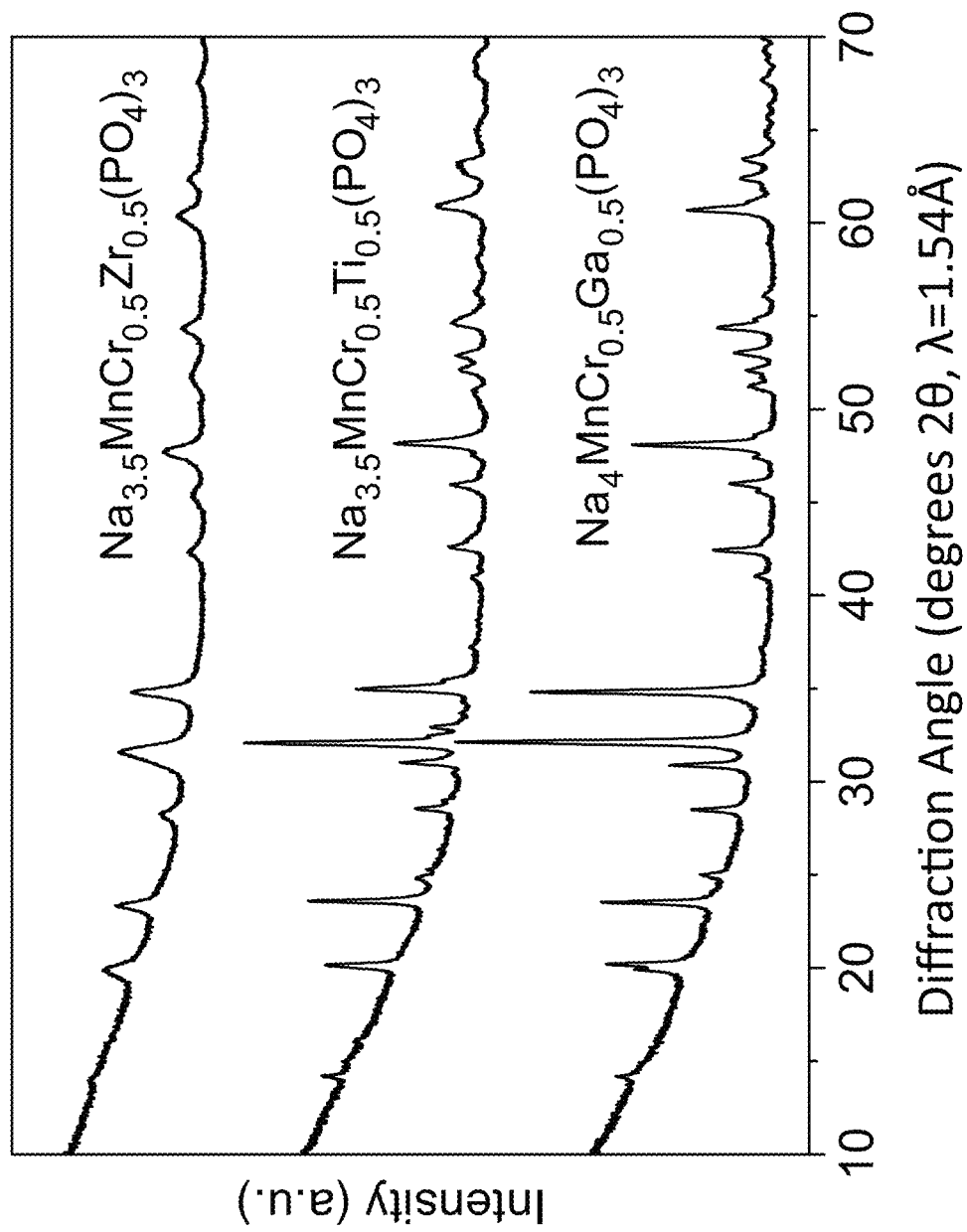
FIG. 11 is a graph of intensity (arbitrary units) versus diffraction angle (degrees 2-theta) and shows the results of X-ray diffraction analysis of $Na_{3.5}MnCr_{0.5}Zr_{0.5}(PO_4)_3$, $Na_{3.5}MnCr_{0.5}Ti_{0.5}(PO_4)_3$, and $Na_4MnCr_{0.5}Ga_{0.5}(PO_4)_3$.

In-situ X-ray analysis further illustrates the unexpectedly reversible charge discharge reaction in the $Na_4MnCr(PO_4)_3$ of Example 1-1. Shown in FIGS. 9 and 10 are the results of in-situ x-ray analysis of the $Na_4MnCr(PO_4)_3$/Na cell when cycled between 1.5 V and 4.5V. As shown in FIG. 9 and FIG. 10, the structure of the $Na_4MnCr(PO_4)_3$ of Example 1-1 is observed to expand and contract as the sodium is removed and reinserted into the $Na_4MnCr(PO_4)_3$ structure as the cell is charged and discharged.

Figure 12:
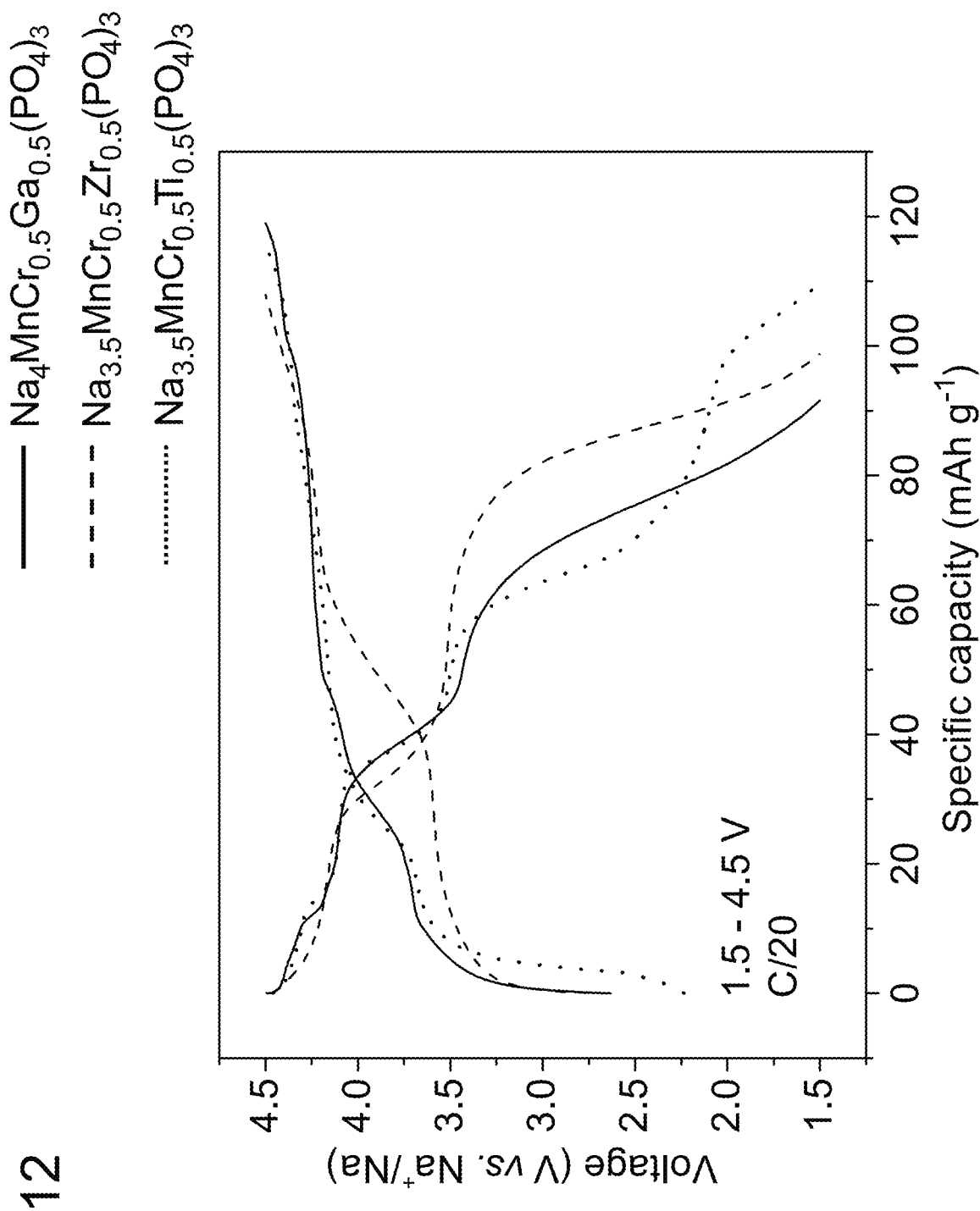
FIG. 12 is a graph of voltage (V) versus specific capacity (milliampere-hours per gram ($mAh \cdot g^{-1}$)) of $Na_4MnCr_{0.5}Ga_{0.5}(PO_4)_3$, $Na_{3.5}MnCr_{0.5}Zr_{0.5}(PO_4)$, and $Na_{3.5}MnCr_{0.5}Ti_{0.5}(PO_4)_3$.

Example 2-1: Synthesis of $Na_{3.5}MnCr_{0.5}Zr_{0.5}(PO_4)_3$, $Na_{3.5}MnCr_{0.5}Ti_{0.5}(PO_4)_3$, and $Na_4MnCr_{0.5}Ga_{0.5}(PO_4)_3$ $Na_{3.5}MnCr_{0.5}Zr_{0.5}(PO_4)_3$, $Na_{3.5}MnCr_{0.5}Ti_{0.5}(PO_4)_3$, and $Na_4MnCr_{0.5}Ga_{0.5}(PO_4)_3$ are prepared using the same method as in Example 1-1, except that half of the chromium (III) nitrate nonahydrate is substituted with zirconium(IV) acetylacetonate, titanium(IV) ethoxide, and gallium(III) acetylacetonate, respectively. X-ray diffraction patterns for $Na_{3.5}MnCr_{0.5}Zr_{0.5}(PO_4)_3$, $Na_{3.5}MnCr_{0.5}Ti_{0.5}(PO_4)_3$, and $Na_4MnCr_{0.5}Ga_{0.5}(PO_4)_3$ are shown in FIG. 12. The X-ray diffraction patterns illustrate that these materials are isostructural with $Na_4MnCr(PO_4)_3$.

Example 2-2: Electrochemical Evaluation of $Na_{3.5}MnCr_{0.5}Zr_{0.5}(PO_4)_3$, $Na_{3.5}MnCr_{0.5}Ti_{0.5}(PO_4)_3$, and $Na_4MnCr_{0.5}Ga_{0.5}(PO_4)_3$ of Example 2-1

The $Na_{3.5}MnCr_{0.5}Zr_{0.5}(PO_4)_3$, $Na_{3.5}MnCr_{0.5}Ti_{0.5}(PO_4)_3$, and $Na_4MnCr_{0.5}Ga_{0.5}(PO_4)_3$ prepared in Example 2-1 are evaluated in the same manner as disclosed in EXAMPLE 1-3. As shown in FIG. 12, when cycled at a C/20 rate between 1.5V and 4.5V versus Na/Na$^+$, $Na_4MnCr_{0.5}Ga_{0.5}(PO_4)_3$ provided 90 mAh/g, $Na_{3.5}MnCr_{0.5}Zr_{0.5}(PO_4)_3$ provided 100 mAh/g, and $Na_{3.5}MnCr_{0.5}Ti_{0.5}(PO_4)_3$ provided 110 mAh/g. Also, also, in each material, distinct voltage plateaus are observed, indicating that Mn, Cr, Ga, Zr, and Ti are each chemically active.

Figure 13:
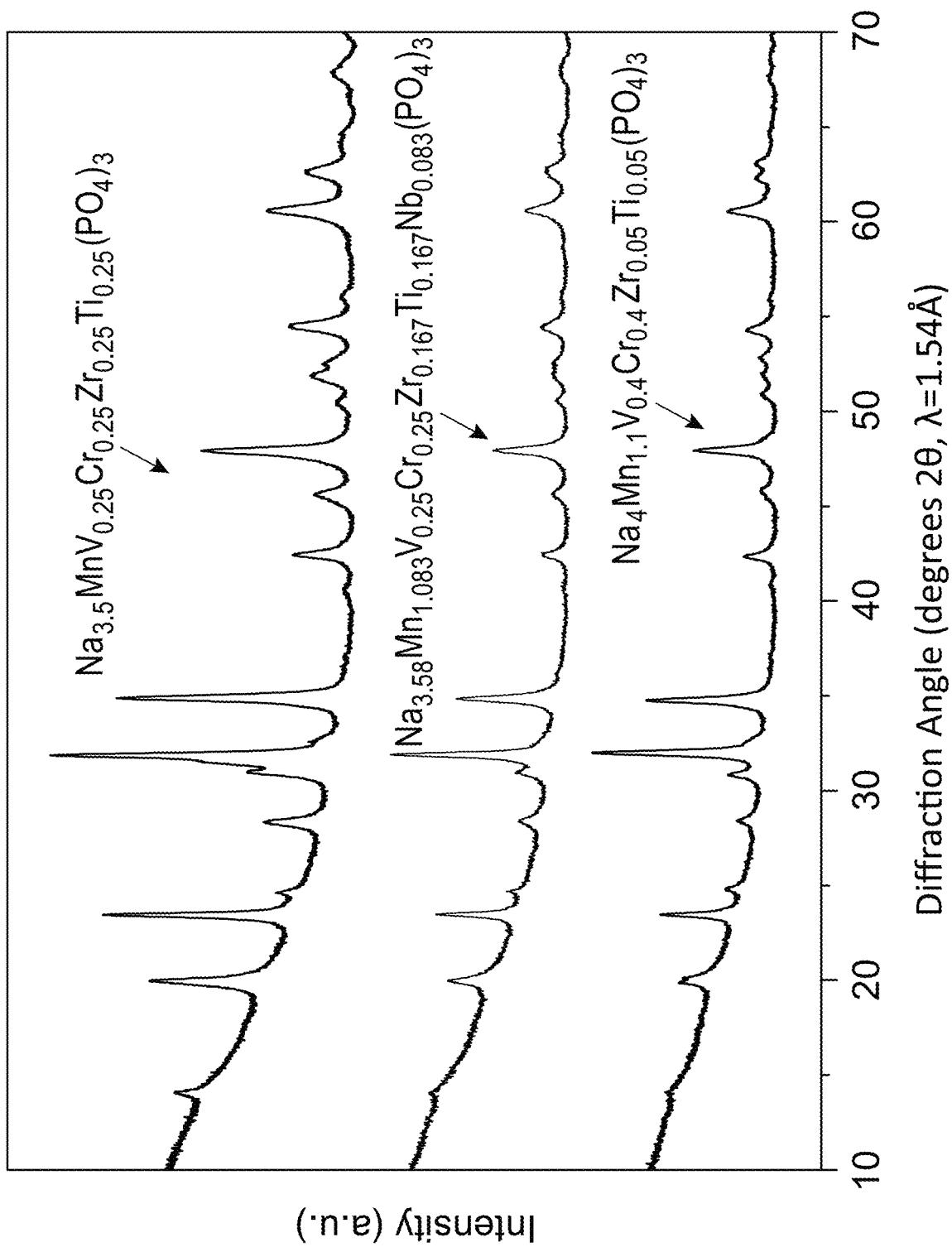
FIG. 13 is a graph of intensity (arbitrary units) versus diffraction angle (degrees 2-theta) and shows the results of X-ray diffraction analysis of $Na_{3.5}MnV_{0.25}Cr_{0.25}Zr_{0.25}Ti_{0.25}(PO_4)_3$, $Na_{3.58}Mn_{1.083}V_{0.25}Cr_{0.25}Zr_{0.167}Ti_{0.167}Nb_{0.083}(PO_4)_3$, and $Na_4Mn_{1.1}V_{0.4}Cr_{0.4}Zr_{0.05}Ti_{0.05}(PO_4)_3$.

Example 3-1: Synthesis of $Na_{3.5}MnV_{0.25}Cr_{0.25}Zr_{0.25}Ti_{0.25}(PO_4)_3$, $Na_{3.58}Mn_{1.083}V_{0.25}Cr_{0.25}Zr_{0.167}Ti_{0.167}Nb_{0.083}(PO_4)_3$, and $Na_4Mn_{1.1}V_{0.4}C_{0.4}Zr_{0.05}Ti_{0.05}(PO_4)_3$ $Na_{3.5}MnV_{0.25}Cr_{0.25}Zr_{0.25}Ti_{0.25}(PO_4)_3$, $Na_{3.58}Mn_{1.083}V_{0.25}Cr_{0.25}Zr_{0.167}Ti_{0.167}Nb_{0.083}(PO_4)_3$, and $Na_4Mn_{1.1}V_{0.4}Cr_{0.4}Zr_{0.05}Ti_{0.05}(PO_4)_3$ are prepared using the same method as in Example 1-1, except that stoichiometric amounts of the chromium(III) nitrate nonahydrate is substituted with zirconium(IV) acetylacetonate, titanium(IV) ethoxide, gallium(III) acetylacetonate, niobium(V) ethoxide, and vanadium(III) acetylacetonate. The X-ray diffraction patterns for $Na_{3.58}Mn_{1.083}V_{0.25}Cr_{0.25}Zr_{0.167}Ti_{0.167}Nb_{0.083}(PO_4)_3$, and $Na_4Mn_{1.1}V_{0.4}Cr_{0.4}Zr_{0.05}Ti_{0.05}(PO_4)_3$ are shown in FIG. 13. The X-ray diffraction patterns illustrate that these materials are isostructural with $Na_4MnCr(PO_4)_3$.

The compositions, methods, and articles disclosed herein can alternatively comprise, consist of, or consist essentially of, any appropriate components or steps herein disclosed. The compositions, methods, and articles can additionally, or alternatively, be formulated so as to be devoid, or substantially free, of any steps, components, materials, ingredients, adjuvants, or species that are otherwise not necessary to the achievement of the function or objectives of the compositions, methods, and articles.

All values and ranges are understood to be inclusive of the stated value and a range dictated by context, e.g., a degree of error associated with measurement of the particular quantity, or a tolerance in manufacture. For example, a value can include a range of ±8% or 5%, or 2% of a given value.

All ranges disclosed herein are inclusive of the endpoints, and the endpoints are independently combinable with each other. "Combination" is inclusive of blends, mixtures, alloys, reaction products, and the like. The terms "first," "second," and the like, do not denote any order, quantity, or importance, but rather are used to distinguish one element from another. As used herein, "a", "an," "the," and "at least one" do not denote a limitation of quantity, and are intended to include both the singular and plural, unless the context clearly indicates otherwise. For example, "an element" has the same meaning as "at least one element," unless the context clearly indicates otherwise. "At least one" is not to be construed as limiting "a" or "an." "Or" means "and/or" unless clearly stated otherwise. Reference throughout the specification to "an aspect" means that a particular element described in connection with the aspect is included in at least one aspect described herein, and may or may not be present in other aspects. In addition, it is to be understood that the described elements may be combined in any suitable manner in the various aspects.

Unless defined otherwise, technical and scientific terms used herein have the same meaning as is commonly understood by one of skill in the art to which this application belongs. All cited patents, patent applications, and other references are incorporated herein by reference in their entirety. However, if a term in the present application contradicts or conflicts with a term in the incorporated reference, the term from the present application takes precedence over the conflicting term from the incorporated reference.

An exemplary embodiment is described herein with reference to a cross section illustration that is a schematic illustration of an idealized embodiment. As such, variations from the shapes of the illustrations as a result, for example, of manufacturing techniques and/or tolerances, are to be expected. Thus, the disclosed embodiment described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

While particular aspects have been described, alternatives, modifications, variations, improvements, and substantial equivalents that are or may be presently unforeseen may arise to applicants or others skilled in the art. Accordingly, the appended claims as filed and as they may be amended are intended to embrace all such alternatives, modifications variations, improvements, and substantial equivalents.

What is claimed is:

1. A compound of Formula I:

$$Na_xMn_aM_b(PO_{4-\delta})_3 \qquad (I)$$

wherein

M comprises Nb, Ga, Cr, Ti, or a combination thereof,
a is equal to or greater than 0.8 to equal to or less than 1.5,
b is equal to or greater than 0.5 to equal to or less than 1.2,
x is greater than 0 to equal to or less than 4,
δ is equal to or greater than 0 to equal to or less than 1, and
a sum of a and b is 2.

2. The compound of claim 1, wherein M comprises Cr.

3. The compound of claim 2, wherein M is Cr.

4. The compound of claim 1, wherein x is 1≤x≤4.

5. The compound of claim 4, wherein the compound of Formula I is $Na_xMnCr(PO_4)_3$.

6. The compound of claim 1, wherein a crystal structure of the compound of Formula 1 comprises a $PO_4$ tetrahedron and a metal-centered oxygen octahedron.

7. The compound of claim 6, wherein the $PO_4$ tetrahedron and the metal-centered oxygen octahedron share a corner.

8. The compound of claim 7, wherein a metal of the metal-centered oxygen octahedron comprises Nb, Ga, Cr, Ti, or a combination thereof.

9. An electrode composition comprising:
the compound of claim 1; and
a conductive agent, a binder, or a combination thereof.

10. The electrode composition of claim 9, wherein the compound of Formula I is $Na_xMnCr(PO_4)_3$.

11. A positive electrode comprising:
a current collector; and
the compound of claim 1 on the current collector.

12. The positive electrode of claim 11, wherein the compound of Formula I is $Na_xMnCr(PO_4)_3$.

13. A sodium-ion battery comprising:
a positive electrode;
a negative electrode; and
an electrolyte between the positive electrode and the negative electrode, wherein the positive electrode comprises the compound of claim 1.

14. The sodium-ion battery of claim 13, wherein M is Cr.

15. A method of manufacturing a positive electrode, the method comprising:
disposing a composition comprising the compound of claim 1 on a current collector to manufacture the positive electrode.

16. A method of manufacturing a sodium-ion battery, the method comprising:
providing a positive electrode comprising the compound of claim 1, a negative electrode, and separator;
disposing the separator between the positive electrode and the negative electrode; and
contacting the positive electrode and the negative electrode with the electrolyte between to manufacture the sodium ion battery.

17. A method of synthesizing a compound of Formula I, the method comprising:
providing a precursor comprising Na, a precursor comprising Mn, and a precursor comprising M, wherein the precursor comprising Na, the precursor comprising Mn, the precursor comprising M, or combination thereof, is a phosphate;
combining the precursor comprising Na, the precursor comprising Mn and the precursor comprising M to provide a mixture; and
thermally treating the mixture to synthesize the compound of Formula I $$Na_xMn_aM_b(PO_{4-\delta})_3 \qquad (I)$$

wherein
M comprises Nb, Ga, Cr, Ti, or a combination thereof,
a is equal to or greater than 0.8 to equal to or less than 1.5,
b is equal to or greater than 0.5 to equal to or less than 1.2,
x is greater than 0 to equal to or less than 4,
δ is equal to or greater than 0 to equal to or less than 1, and
a sum of a and b is 2.

18. The method of claim 17, wherein the compound of Formula I is $Na_xMnCr(PO_4)_3$.

19. A compound of Formula I:

$$Na_xMn_aM_b(PO_{4-\delta})_3 \qquad (I)$$

wherein
M comprises V, Nb, Ga, Cr, Ti, Zr, or a combination thereof,
a is greater than 1 to less than 1.3,
b is greater than 0.7 to less than 1,
x is greater than 0 to equal to or less than 4,
δ is equal to or greater than 0 to equal to or less than 1, and
a sum of a and b is 2.

20. The compound of claim 19, wherein M comprises Cr.

* * * * *